Nov. 24, 1953     T. J. CAPPELLO     2,660,107
COFFEE PERCOLATOR
Filed June 30, 1951
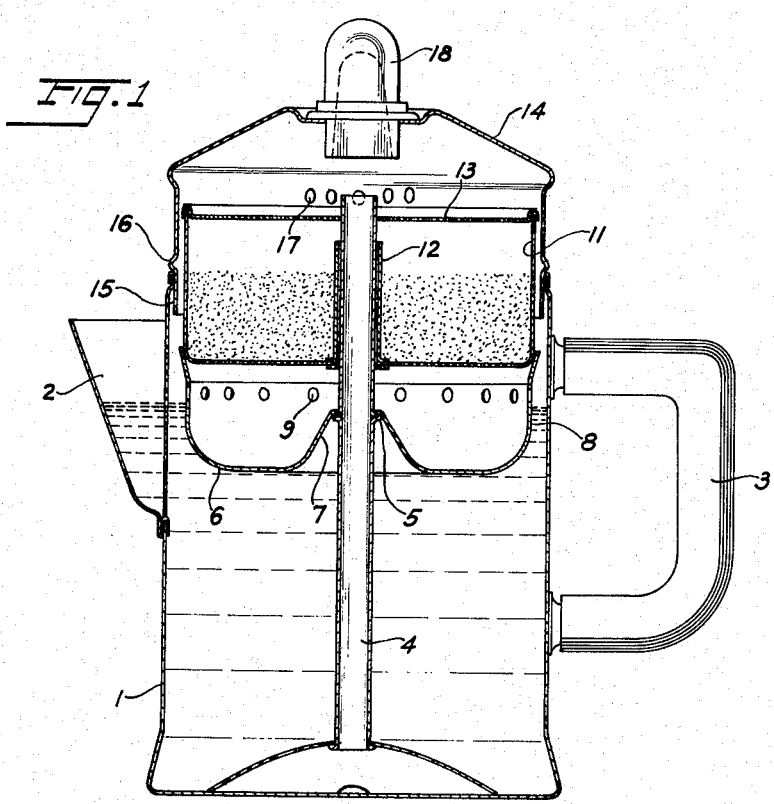
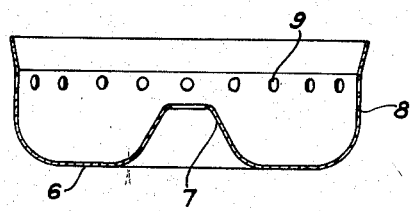
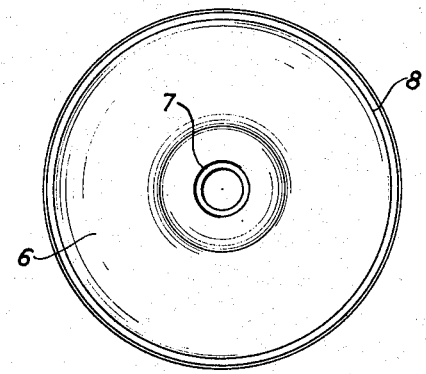
INVENTOR.
*TRIEST J. CAPPELLO*
BY *Harold E. Stonebraker*
ATTORNEY.

Patented Nov. 24, 1953

2,660,107

UNITED STATES PATENT OFFICE 2,660,107

COFFEE PERCOLATOR

Triest J. Cappello, Seneca Falls, N. Y.

Application June 30, 1951, Serial No. 234,586

4 Claims. (Cl. 99—310)

This invention relates to coffee percolators of the general type including a percolator tube through which water moves upwardly upon boiling, and a basket supported on the percolator tube for holding ground coffee through which the water travels downwardly after its exit from the top of the percolator tube, and it has for its purpose to afford a structure that operates more quickly, efficiently and satisfactorily than prior types of percolators with no material increase in the cost of manufacture.

In coffee percolators of the type mentioned above, when the percolator contains the proper amount of water for which it is designed, if the water is permitted to boil continuously without reducing the applied heat, the water will quickly boil over and exude a mass of foamy suds and liquid from the spout, necessitating constant watching and reduction of the heat after the water boils, and a principal purpose of the invention is to afford a construction that eliminates this undesirable characteristic and permits the water to be boiled continuously without reducing the heat of the burner, with the result that no sudsy foam is produced, there is no likelihood of foam or liquid boiling over through the spout, and the operator does not have to watch the percolator and burner.

A more particular purpose of the invention is to afford a construction that when filled with water to a proper level effectually reduces the amount of water in the percolator that is subjected to boiling at any given time and in this manner eliminating the possibility of a given amount of water boiling over.

Still a further purpose of the invention is to provide a structure that retards or holds back movement of the water from the ground coffee basket to the boiling liquid in the bottom of the percolator in such a manner as to eliminate formation of sudsy foam and to collect and partially cool off the liquid coffee after it leaves the coffee basket before returning to the boiling mass, thus reducing the boiling action and the probability of boiling over through the spout.

An additional object of the invention is to afford a construction that reduces the pressure set up in the percolator that would otherwise tend to force some of the liquid out through the spout after continued boiling, and to accomplish this by the provision of pressure outlets in the percolator cover, such outlets being located above the coffee basket and readily accessible to pressure around and beneath the basket above the body of boiling liquid.

To these and other ends, the invention consists in the construction and arrangement of parts that will appear clearly from the following description when read in conjunction with the accompanying drawings, the novel features being pointed out in the claims following the specification.

In the drawings:

Fig. 1 is a vertical sectional view of a coffee percolator constructed in accordance with a preferred embodiment of the invention, and showing the parts in operating position, with ground coffee in the coffee basket and water in the percolator at the proper level prior to applying heat;

Fig. 2 is a vertical sectional view of the liquid container within which the coffee basket is supported, and Fig. 3 is a plan view of the liquid container.

Referring more particularly to the drawings in which like reference numerals refer to the same parts throughout the several views, I designates the body of the percolator, 2 is the pouring spout, 3 is a handle, and 4 is the percolator tube provided with a shoulder or ledge 5 on which the coffee basket is customarily supported.

The construction thus far described is the same as in conventional percolators, and the present construction differs from prior types of percolators by utilizing a liquid container located beneath the coffee basket and preferably supporting the same, the liquid container being adapted to receive the liquid after it passes from the coffee basket and to retain it temporarily before passing on downwardly to the body of boiling liquid.

In order to accomplish this, there is provided a liquid container having a dished bottom 6 with a central upwardly curved and inwardly tapering collar 7 terminating in a central opening that permits the liquid container to be positioned over the percolator tube 4 with the central collar 7 resting upon the shoulder 5. The curved bottom 6 of the liquid container terminates at its outer edge in a vertical inclined annular wall 8 that is slightly larger in diameter at its upper edge than the bottom of the coffee basket and somewhat smaller at its lower edge, so that the coffee basket is supported partially within the liquid container by the inclined vertical wall 8 and somewhat above the bottom thereof. The wall 8 is provided with a series of openings 9 spaced therearound and located at or near the bottom of said wall so that when the parts are in operative position, the openings 9 in the liquid container are arranged beneath the bottom of the coffee basket.

The coffee basket is designated at 11 and has a central hollow stem 12 that telescopes over the percolator tube 4 while 13 designates a perforate spreader plate supported on and resting within the upper edge of the coffee basket and having a central opening to receive the upper end of the percolator tube, as usual in this type of construction.

The percolator basket 11 is preferably higher than the conventional percolator basket so that it extends somewhat above the top of the main body of the percolator to a point within the cover 14, which is provided with a downwardly extending annular flange 15 fitting inside the upper edge of the body of the percolator. A shoulder 16 immediately above the flange 15 supports the cover on the upper edge of the body of the percolator, while 17 designates a series of openings in the side wall of the cover 14 above the top of the body of the percolator and preferably above the coffee basket, although the openings 17 may be otherwise arranged in the cover above the coffee basket and percolator body. 18 designates the usual transparent top detachably arranged in the cover 14 and from which the liquid is diverted downwardly into the coffee basket.

The liquid container 6 and coffee basket 11 are both spaced substantially from the surrounding side wall of the percolator in order to afford freedom of movement for any pressure or steam to the upper part of the percolator whence it exhausts through the openings 17 in the cover.

The coffee basket preferably has a solid imperforate side wall with a restricted number of perforations in its bottom so as to limit movement of liquid from the basket, and to hold back a substantial amount of liquid within the basket before it is permitted further downward movement. As the liquid passes from the coffee basket, it first enters the liquid container 6 filling the latter to the level of openings 9, when the liquid overflows through openings 9 into the main body of the percolator and mixes with the boiling liquid at the bottom.

The liquid container 6 is designed so that the openings 9 are somewhat above the initial level of water in the percolator when the latter is filled to the point for which the percolator is designed, and at this stage the liquid container is empty and water cannot flow into the container through openings 9. With the percolator filled with water to the proper level for its capacity and slightly beneath the openings 9 in the liquid container 6 and ground coffee in the coffee basket to the level indicated, when heat is applied, the boiling water passes upwardly through the percolator tube 4, striking the top 18, and thence on to spreader plate 13 and through the ground coffee in the coffee basket. The liquid emerges slowly through the bottom of the coffee basket into the liquid container 6, which retains the initial coffee liquid from the coffee basket, until the level of coffee in container 6 reaches the openings 9. The liquid coffee then discharges through openings 9 in the liquid container 6 downwardly into the body of boiling water in the bottom of the percolator.

The size and capacity of liquid container 6 and coffee basket 11 are such that when the water is boiling to a maximum degree, sufficient liquid is held back in the coffee basket and in the liquid container 6 so that the level of liquid in the percolator is at a point coinciding approximately with the bottom of the pouring spout 2, and thus much lower than with the same amount of water in a conventional percolator of similar size.

The initial liquid coffee passing from the coffee basket into the liquid container 6 carries with it the sudsy or oily foam that is produced during the early percolating process, and this is disseminated and dispersed through the liquid in the container 6 while in a more or less quiescent and somewhat cooler state, and any pressure that is built up within the percolator as boiling increases passes upwardly around the liquid container and coffee basket and is effectively exhausted through openings 17 in the cover 14.

As a result of the combined effect of the liquid container 6 retarding movement of liquid downwardly and the pressure relief openings 17 in the cover, the liquid from the coffee basket is held back sufficiently from mixing with the boiling liquid and the pressure controlled to such an extent that it is impossible for the liquid to boil over through the spout 2. It is therefore unnecessary to watch the percolator or to reduce the amount of heat, and the operator can after starting the percolating operation leave the percolator unattended for an indefinite time without danger of the liquid boiling over onto the burner, and the operation is completed in a shorter space of time than where the degree of heat must be reduced to protect against boiling over.

While the invention has been described with reference to the particular construction herein shown, it is not confined to the exact details disclosed and this application is intended to cover such changes or modifications as may come within the purposes of the invention and the scope of the following claims.

I claim:

1. In a coffee percolator of the type in which water is recirculated through a coffee basket and including a pot having a generally cylindrical body and a pouring spout near the top of said cylindrical body in communication with the interior of the body, a percolator tube and a coffee basket removably arranged thereon and spaced from said cylindrical body, the bottom of the coffee basket being located beneath the top of said pouring spout, and a liquid container removably mounted on the percolator tube with its upper edge surrounding the lower portion of the coffee basket, the liquid container being located above the bottom of the pouring spout spaced from said cylindrical body and having overflow openings below the coffee basket, the liquid container having a diameter approximately the diameter of the coffee basket and a capacity substantially less than that of said cylindrical body and being in communication through said overflow openings with the bottom of said cylindrical body, said liquid container acting to permit continuous percolation and circulation of water from the bottom of the cylindrical body through the percolator tube to the coffee basket, thence to the liquid container, and from the liquid container through its overflow openings to the cylindrical body.

2. In a coffee percolator of the type in which water is recirculated through a coffee basket and including a pot having a generally cylindrical body and a pouring spout located adjacent to the top of said cylindrical body and communicating with the interior of said cylindrical body, a percolator tube, a liquid container removably mounted on the percolator tube with its bottom arranged above the bottom of said pouring spout, and a coffee basket surrounded at its bottom edge and removably supported within said liquid container, the coffee basket being spaced from said cylindrical body with its bottom located beneath the top of said pouring spout and said liquid container being spaced from said cylindrical body and having substantially the same diameter as the coffee basket with overflow openings located beneath the bottom of the coffee basket and substantially above the bottom of the container, the liquid container having a capacity substantially less than that of said cylindrical body and acting to permit continuous percolation and circulation of water from the bottom of the cylindrical body through the percolator tube to the coffee basket, thence to the liquid container, and from the liquid container through its overflow openings to the cylindrical body.

3. In a coffee percolator of the type in which water is recirculated through a coffee basket and including a pot having a generally cylindrical body and a pouring spout near the top of said cylindrical body in communication with the interior of the body, a percolator tube and a coffee basket removably arranged thereon and spaced from said cylindrical body, a liquid container removably mounted on the percolator tube and having an outwardly inclined upper edge which receives and supports the bottom of the coffee basket and is spaced from said cylindrical body, said liquid container having a diameter approximately the diameter of the coffee basket with substantial depth and in communication with the bottom of said cylindrical body through overflow openings, the bottom of the coffee basket being located beneath the top of said pouring spout and the bottom of the liquid container being located above the bottom of the pouring spout and said overflow openings in the liquid container being arranged beneath the bottom of the coffee basket and above the bottom of the pouring spout, the liquid container having a capacity substantially less than that of said cylindrical body and acting to permit continuous percolation and circulation of water from the bottom of the cylindrical body through the percolator tube to the coffee basket, thence to the liquid container, and from the liquid container through its overflow openings to the cylindrical body.

4. In a coffee percolator of the type in which water is recirculated through a coffee basket and including a pot having a generally cylindrical body and a pouring spout arranged near the top of the cylindrical body and in communication with the interior of the body, a percolator tube and a coffee basket removably mounted thereon and spaced from said cylindrical body, the bottom of the coffee basket being located somewhat beneath the top of said pouring spout, a supporting shoulder on said percolator tube, and a liquid container having a dished bottom terminating at its center in an upwardly and inwardly tapering neck that is removably engageable with said shoulder, the liquid container being located above the bottom of said spout spaced from said cylindrical body and having overflow openings below the bottom of the coffee basket and near the top of said container, the liquid container having a diameter approximately the diameter of the coffee basket with substantial depth and being in communication through said overflow openings with the bottom of said cylindrical body, the liquid container having a capacity substantially less than that of said cylindrical body and acting to permit continuous percolation and circulation of water from the bottom of the cylindrical body through the percolator tube to the coffee basket, thence to the liquid container, and from the liquid container through its overflow openings to the cylindrical body.

TRIEST J. CAPPELLO.

References Cited in the file of this patent

UNITED STATES PATENTS

| Number | Name | Date |
|---|---|---|
| 133,582 | Hofman | Dec. 3, 1872 |
| 153,590 | McKalip | July 28, 1874 |
| 212,801 | Hussey | Mar. 4, 1879 |
| 1,136,776 | Collins | Apr. 20, 1915 |
| 1,400,749 | Johnstone | Dec. 20, 1921 |
| 1,469,139 | Acquaviva | Sept. 25, 1923 |
| 1,573,668 | Wood | Feb. 16, 1926 |
| 1,582,685 | Pence | Apr. 27, 1926 |
| 1,762,209 | Aborn | June 10, 1930 |
| 1,802,591 | Brown | Apr. 28, 1931 |
| 1,921,748 | Grometstein | Aug. 8, 1933 |